June 10, 1930. T. H. STRACHAN 1,762,204
WEIGHING SCALE
Filed March 29, 1929 3 Sheets-Sheet 1
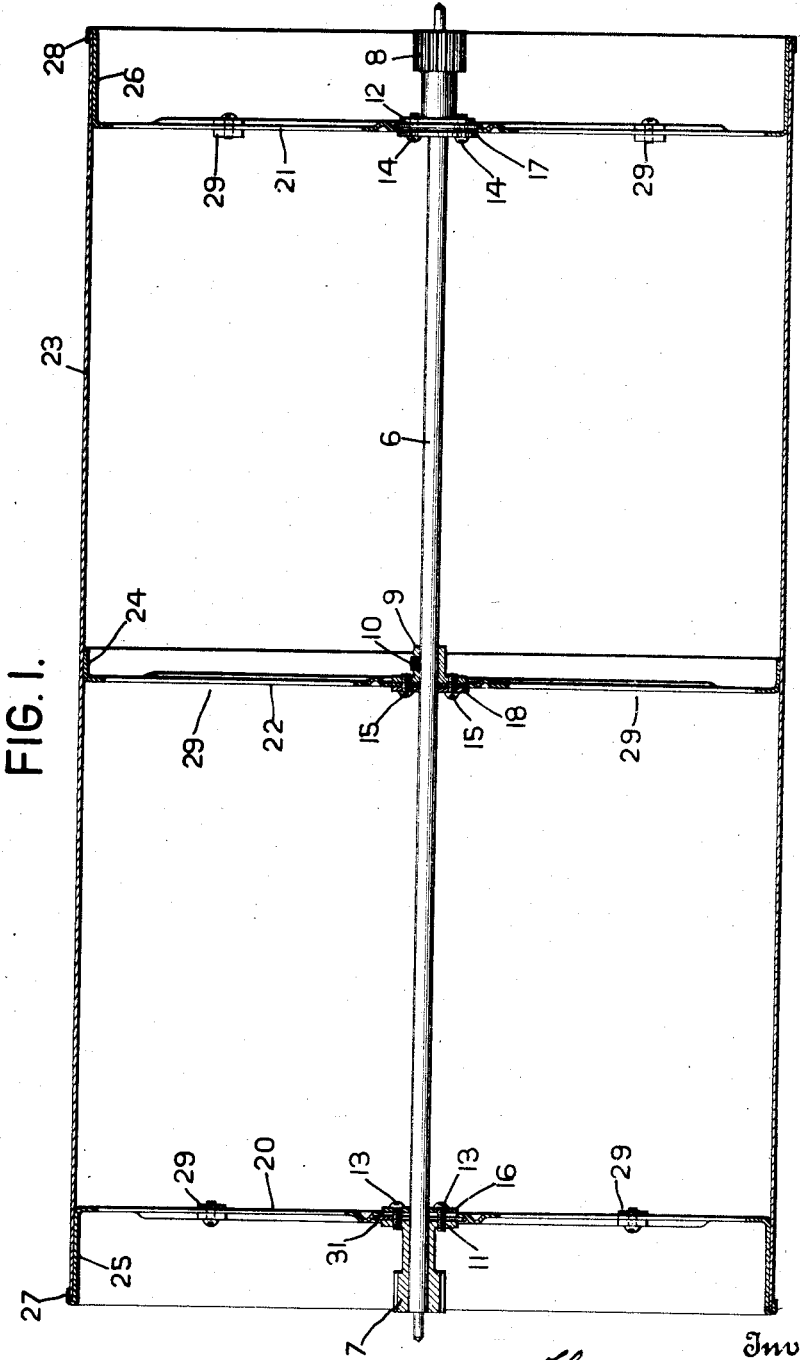
FIG. I.
Inventor
Thomas H. Strachan
By his Attorney
W. N. Wilson

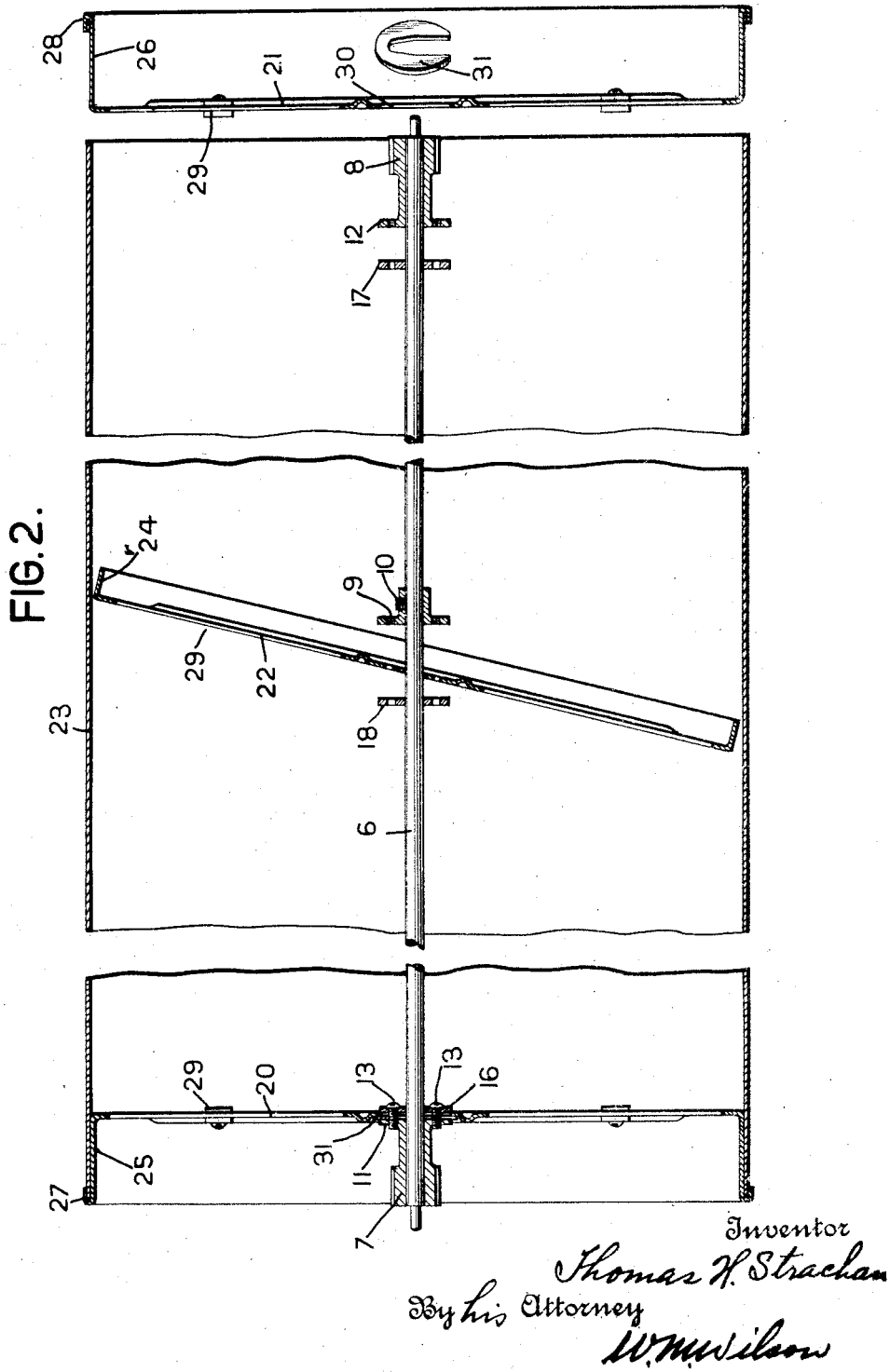

June 10, 1930.  T. H. STRACHAN  1,762,204
WEIGHING SCALE
Filed March 29, 1929.  3 Sheets-Sheet 3
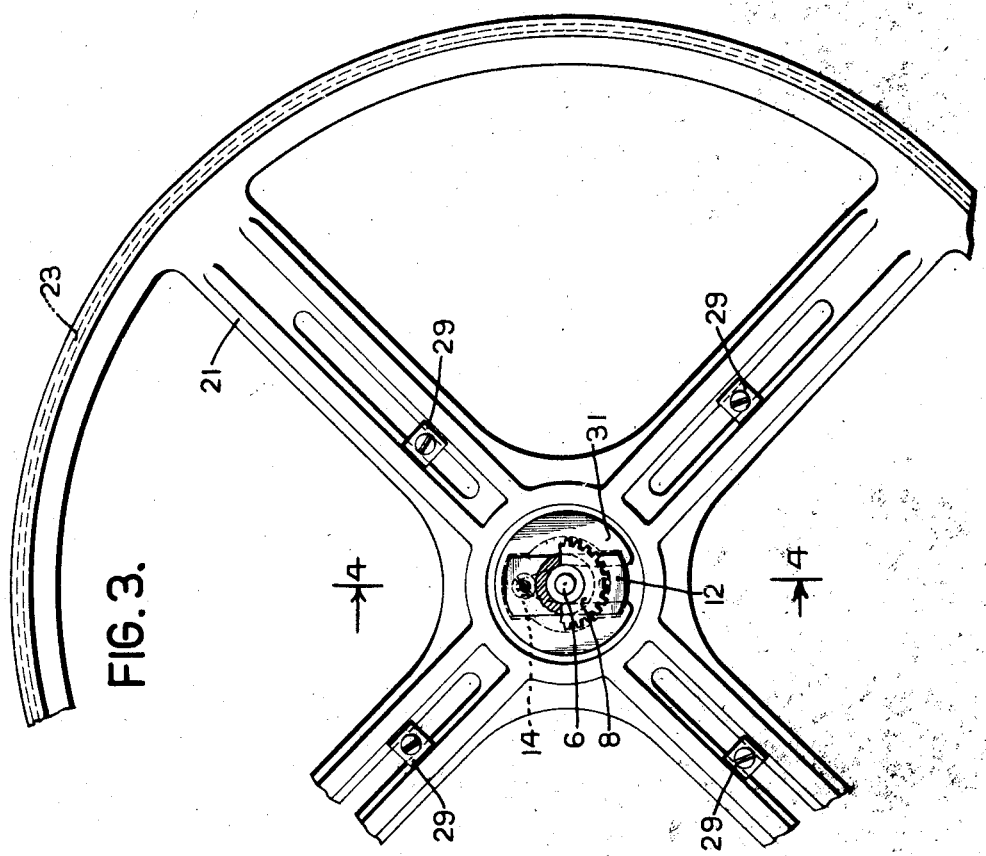
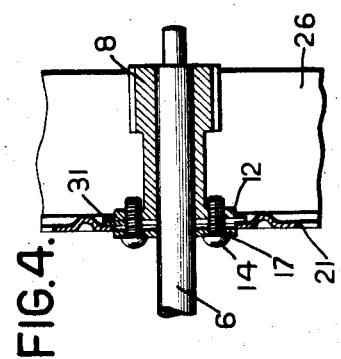
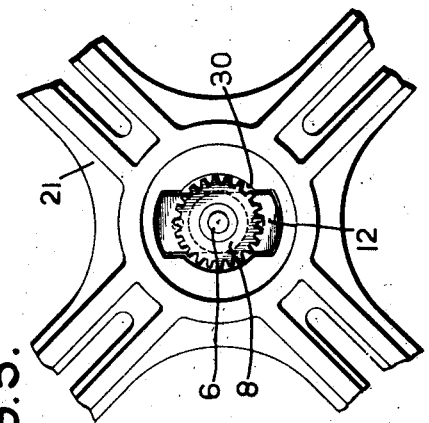
Inventor
Thomas H. Strachan
By his Attorney
W. H. Wilson Patented June 10, 1930

1,762,204

UNITED STATES PATENT OFFICE

THOMAS H. STRACHAN, OF LYNBROOK, NEW YORK, ASSIGNOR TO DAYTON SCALE COMPANY, OF DAYTON, OHIO, A CORPORATION OF NEW JERSEY

WEIGHING SCALE

Application filed March 29, 1929. Serial No. 350,943.

The present invention relates to indicating devices for scales. Such devices may comprise a drum chart having weight and price indications thereon and supported by a plurality of spiders mounted on a shaft forming the axis of rotation for said drum.

The shaft cooperates with the weighing beam and is rotated in proportion to the load offsetting force applied when weighing an article and the indications serve to ascertain the weight and price of the article weighed.

The operating connections include a pinion on each end of the drum shaft to cooperate with racks operated from the weighing beam. It is usual to permanently fix the pinions on the shaft by a pressing, shrinking, or the like process. This is necessary to absolutely prevent shifting of the pinion relative to the drum which would destroy the accuracy of the scale. Attached to the pinions on the drum shaft are the end spiders carrying the drum. Obviously, it is required to rigidly connect the pinions and the end spiders in order to insure accurate weighing.

In the prior practice, the end spider and pinion were not removable separately from the drum shaft. Consequently, when any of these spiders or the drum chart itself was damaged, the entire drum, pinions, spiders, and chart had to be removed and replaced.

The object of the instant invention is to provide means for rigidly securing the spiders to the pinion in such a manner that any or both of the end spiders may be removed while leaving the pinions undisturbed on the drum shaft.

Furthermore, it has been necessary in the prior art to first fix the pinions and spiders in place on the drum shaft and then carefully place the drum chart on the spiders. The fit between the spiders and the chart must be very snug to provide a smooth unruffled chart after the latter is glued to the spiders. Further, in certain States, the law requires that the surface of the chart from the reading wire must never exceed a very small fraction of an inch. If the fit of the chart on the spiders is not snug, the chart will sag and the distance between the chart surface and index will exceed the limits provided by law. The difficulty of placing a chart with a snug fit on spiders already assembled on the shaft will be obvious and often is the cause of charts being ruffled or spoilt in assembling.

Another object of the invention is therefore to provide a new method of assembling a chart and spiders in a drum scale which would obviate damaging of the chart by wrinkling, shrinking, or the like.

Other objects and advantages of this invention will be apparent from the specification and accompanying drawings which show one embodiment of this invention wherein similar reference numerals indicate similar parts and wherein the drawings;

Fig. 1 is a longitudinal sectional view of the drum indicator assembled.

Fig. 2 is a section illustrating the details of the fastening device and method of assembling the drum and chart.

Fig. 3 is an end view of the drum indicator with certain parts broken away.

Fig. 4 is a sectional view on line 4—4 of Fig. 3.

Fig. 5 illustrates the essential details in the spider construction.

Referring to Fig. 1 a shaft 6 is provided with two pinions 7 and 8 fixed thereon at each end and an adjustable flange member 9 fixed to said shaft by means of set screw 10. Integral with the pinions 7 and 8 are flanges 11 and 12 provided with threaded holes to receive the screws 13 and 14. In like manner the flange member 9 is provided with holes to receive the screws 15. Washers 16, 17 and 18 are provided with holes corresponding to the holes of the flange members 11, 12 and 9 with which they respectively cooperate so that by inserting spiders 20, 21 and 22 between the flange members and their respective washers and tightening up on the holding screws, these spiders will be firmly held in position on the shaft 6 to form a supporting structure for a chart 23. The spider 22 is provided with a flat and comparatively narrow flange 24 around its periphery which serves as a central support for the chart 23. The spiders 20 and 21 are provided with comparatively wide peripheral flanges 25 and 26 and rolled-over edges 27 and 28 under which edges the end of the chart is inserted to hold it in position and close to the periphery of said spiders. These spiders are provided with adjustable counter balance weights 29 which may be moved radially along slotted spokes in the spiders to properly balance them in all directions about the axis. As this construction is old and has no part in the present invention, further explanation of this will be unnecessary.

The spider 22 forming the central supporting structure is porvided with holes corresponding to the screw holes in the flange member 9 and is provided with a center hole of approximately the same diameter of the shaft 6 to receive said shaft and is held rigidly in its central position by means of screws and washer 18 to the flange member 9 by the screws 15.

The two end spiders 20 and 21 are identical in construction and are provided at the center with a hole 30 which conforms to the contour of the pinions 7 and 8 and the flange members 11 and 12 which are cut away as shown in Fig. 5. Cooperating with the flange members 11 and 12 are washers 31 provided with a slot running from the periphery through the center and near to the periphery on the opposite side. This washer is of an outside diameter exceeding that of the flange members 11 and 12 and exceeding the hole in the center of the spiders 20 and 21. Thus with the washers 31 placed to straddle the shaft 6 and the screws 13 and 14 and bearing against the flange members 11 and 12 on one side and the spiders 20 and 21 on the other, drawing down of washers 16 and 17 by screws 13 and 14 will serve to clamp said spiders in position.

The method of assembling the chart and the support therefor is as follows: The flanged hub 9, intermediate spider 22, washers 16, 17 and 18, and pinions 7 and 8 are assembled on shaft 6. The pinions are then permanently fastened to the shaft by a pressing operation or the like. Flange 9 is then set in position by means of set screw 10. One of the end spiders is then assembled and fixed to the associated pinion. As shown in Fig. 2, spider 20 is in assembled condition. The chart 23 is then placed over the periphery 25 of spider 20 and beneath the flange 27 and the latter pressed down to rigidly fix the chart relative to the shaft. The movement of the chart 23 over periphery 25 is not hindered by spider 22 which is in the inclined and unfastened position shown in Fig. 2. Spider 22 may now be fixed to the flange 9 by screws threaded into flange 9 and the washer 18. In being fixed to the shaft at this time, spider 22 will maintain the chart surface taut. The spider 21 is now moved between washer 17 and flange 12, the opening 30 in the spider hub being large enough to freely pass over the pinion and its flange. Washer 31 is then placed between the hub of the spider and the flange 12 thus preventing movement of the spider past the flange 12. The screws are then inserted in the washer 17 and flange 12 and the spider 21 clamped tightly in position. The flange 28 of spider 21 is then pressed down on the chart surface.

If either end spider is damaged, the screws may be removed from the flanges 12 or 13 and respective cooperating washers 17 and 16, the U-shaped washer 31 then removed, and the spider freely moved past the pinion.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In a weighing scale, an indicator drum comprising a shaft, a pinion rigidly fixed to an end of the shaft, a spider having a hub provided with an opening permitting the spider to be freely moved axially over and past the pinion, means for rigidly fastening the spider to the pinion, and a chart supported on the periphery of the spider.

2. In a weighing scale, an indicator drum comprising a shaft, a pinion rigidly fixed to an end of the shaft and having a flange at one end, a spider having a hub provided with an opening permitting the spider to be freely moved axially over and past the pinion and flange, a washer open at one end to permit it to be freely placed on the shaft by moving it in a radial direction, the opening in said washer being too small to allow movement of the washer axially past the pinion and flange, a second washer positioned on the shaft, means for clamping the spider to the second washer and the pinion flange with the first-named washer located between the pinion flange and the spider, and a chart adapted to be supported on the periphery of the spider.

3. A scale drum comprising a shaft, a pair of pinions thereon one at each end, a cylindrical spider fastened to each pinion, a cylindrical chart adapted to fit over the periphery of the spiders, and a flange provided at the outer side of each spider and adapted to be pressed down on the chart to secure it rigidly to the spiders.

4. The method of constructing a drum scale indicator which has a cylindrical chart and a supporting structure therefor including a pinion and spider at each end of a shaft, which consists in first rigidly attaching the pinions to the shaft, then fixing a spider to one end of the shaft, then inserting the chart over the attached spider and fixing it thereto, and subsequently inserting the other end spider into the chart, moving it past the associated pinion and fixing it to said pinion.

5. The method of constructing a drum scale indicator which has a cylindrical chart and a supporting structure therefor comprising a pinion and spider at each end and an intermediate spider, which consists in first placing an intermediate spider loosely on the shaft, fixing the pinions permanently on each end of the shaft, and then rigidly fixing one end spider to associated end pinion, placing the cylindrical chart over the latter end spider and fixing it thereto, then fixing the intermediate spider to the shaft, and finally moving the remaining end spider past the associated end pinion and under the adjacent end of the chart and fixing the chart thereto.

In testimony whereof I hereto affix my signature.

THOMAS H. STRACHAN.